United States Patent

[11] 3,631,982

[72] Inventor Pierre Lejeune
  Grenoble, France
[21] Appl. No. 2,193
[22] Filed Jan. 12, 1970
[45] Patented Jan. 4, 1972
[73] Assignee NEYRPIC BMB
  Grenoble, France
[32] Priority Jan. 16, 1969
[33] France
[31] 6900700

[54] PROCESS AND APPARATUS FOR THE CONTROL OF PRESSURES FOR THE FORMATION OF A SHEET OR LAYER BY CONTINUOUS FILTRATION OF PARTICLES IN SUSPENSION
5 Claims, 2 Drawing Figs.

[52] U.S. Cl................................................ 210/77,
  210/104, 210/134, 210/137, 210/400

[51] Int. Cl.............................................. B01d 33/04
[50] Field of Search........................................ 210/77,
  103, 104, 134, 137, 351, 387, 398, 400, 401

[56] References Cited
UNITED STATES PATENTS
2,851,161  9/1958  Dahlstrom et al. ........... 210/134 X
1,881,404  10/1932  Hadley ......................... 210/400 X

*Primary Examiner*—John Adee
*Attorney*—Cameron, Kerkam & Sutton

ABSTRACT: A sheet is formed by filtration of a suspension of particles on a moving filter. Loss of suspension where the sheet and filter leave the device is minimized by coordinate control of the absolute pressures above and below the filter to provide a desired pressure differential acting on the filter.

PROCESS AND APPARATUS FOR THE CONTROL OF PRESSURES FOR THE FORMATION OF A SHEET OR LAYER BY CONTINUOUS FILTRATION OF PARTICLES IN SUSPENSION

BACKGROUND OF THE INVENTION

Machines for the formation of sheets or leaves from particles in suspension such as paper fibers or textiles by continuous filtration on a moving screen usually include a casing in which a suspension of particles is introduced with one of the walls of the casing, and usually the lower wall, comprising at least partially an endless screen through which the filtrate is drawn.

Continuous filtration on a moving screen requires the use of an effective hydrostatic height or pressure exerted on the screen as a function of the porosity of the screen, of the draining characteristics of the fibrous band, which in turn depends upon the nature of the particles, of the weight or thickness of the sheet, the speed of sheet formation, the concentration of the particles in the suspension, the length of the filtration cycle and the like.

From one use to the next of the same machine, it may be necessary to modify certain of these filtering parameters and, in particular, the value of the hydrostatic height effectively applied to the screen.

Further, it is necessary to avoid a loss of the suspension from the enclosure or to control this loss in the area where the sheet is removed from the enclosure, as through a gate or nozzle.

Loss of the suspension is avoided by the use of rotary members placed at the outlet of the gate or nozzle and in contact with the sheet.

If the machine does not include rotary sealing members, a loss of the suspension results under the lip of the nozzle which, if in contact with the sheet, may cause deterioration of the sheet unless the rate of flow of the loss is approximately that of the rate of removal of the sheet.

To control this speed of flow it is necessary to regulate the value of the pressure exerted within the enclosure on the exit nozzle as a function of the speed of removal of the sheet.

SUMMARY OF THE INVENTION

The present invention has for an object a process for control of the pressures used in the formation of a sheet by continuous filtration of a suspension of particles on a movable filter, the sheet deposited on the filter leaving the enclosure containing the feed suspension by a nozzle at which a certain loss of suspension occurs in which, in accordance with the cycle of operation, the amount of loss is controlled by regulating the value of the absolute pressure above the level of the suspension in the feed enclosure, and, the amount of filtrate drawn throughout the filter is controlled, by regulation of the absolute pressure under the filter to a value coordinated with that of the first pressure thus providing at the filter a desired differential filtrate extraction pressure.

In particular, this differential extraction pressure on one or the other side of the filtering surface will most often be maintained at constant value for the several values of the absolute pressure above the free level of the suspension.

The present invention also has as an object an apparatus for carrying out this process comprising a feed conduit for the suspension in a chamber followed by a distributor discharging to a free surface in a closed container having two lateral walls, an upper wall and a lower wall which lower wall at least in part includes an endless movable screen moving toward the top of the enclosure with means controlling the absolute pressure in the enclosure above the free surface of the suspension therein, a tank being provided for reception of the filtrate from the filtering wall, means in the tank for controlling the absolute pressure therein and a discharge orifice at the upper extremity of the enclosure having a controlled opening for the sheet formed on the filter.

The space beneath the lower surface of the filter wall along its length can be divided into elementary sections each subjected to a controlled value of absolute pressure for local control of the value of the differential pressure and for control of the distribution of the amount of filtrate extracted along the filter wall.

In this construction, and in accordance with the present invention, the individual means for control of absolute pressure beneath the filter wall is automatically coordinated with respect to the absolute pressure established above the free level of the suspension to obtain a predetermined variation of the differential pressure along the filter wall.

In particular, the variation of the differential pressure along the filter wall would usually be maintained at an identical value for the several values of the pressure above the free level of the suspension.

BRIEF DESCRIPTION OF THE DRAWINGS

The characteristics and advantages of the present invention will appear from the following description of preferred illustrative embodiments thereof and with reference to the accompanying drawings in which.

DESCRIPTION OF THE PREFERRED EMBODIMENTS

Figure 1:
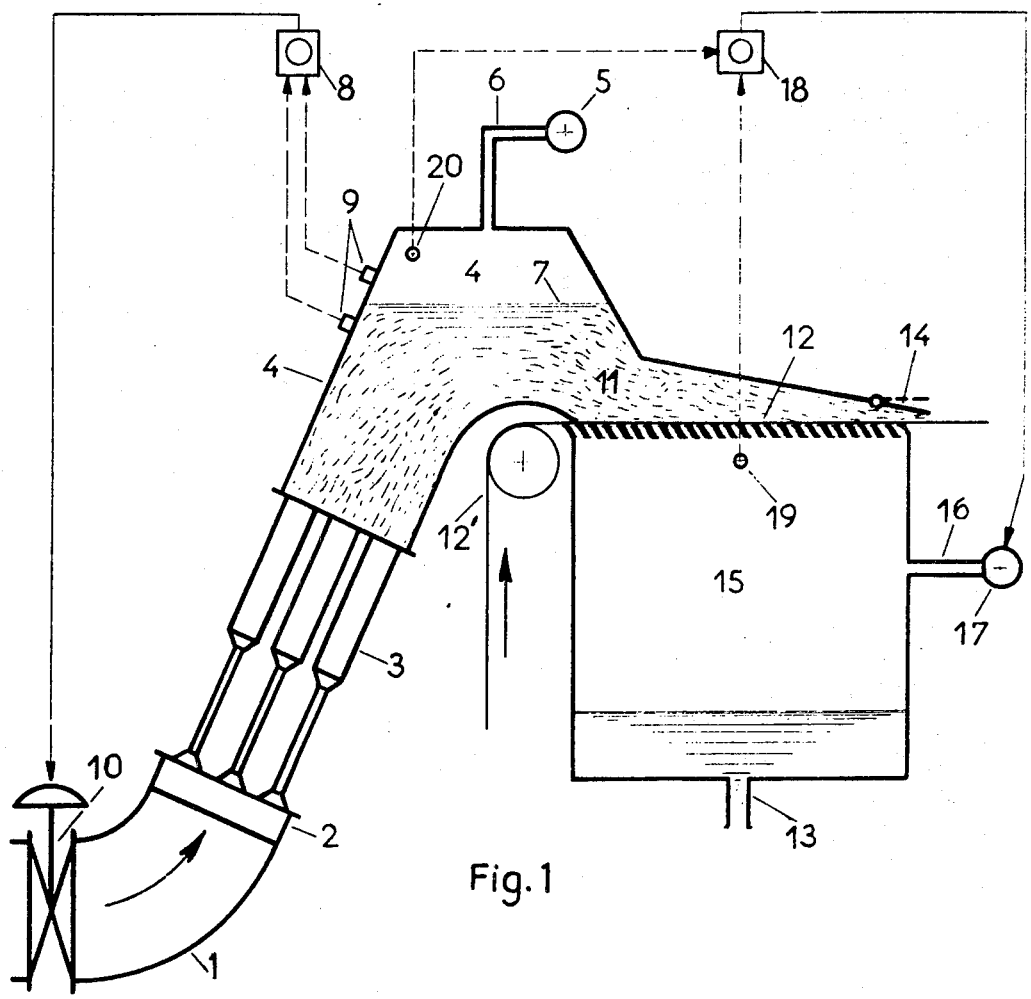
FIG. 1 is a vertical cross section of an embodiment of the present invention employing pressure means in accordance therewith.

With reference to FIG. 1, apparatus for making a sheet by the formation of a film by continuous filtration of a charge on a moving filter includes a conduit 1 in which the suspension flows from suitable preparation apparatus followed by a chamber 2 in which the suspension is distributed to a multitube distributor 3 which equalizes the flow of suspension into a transverse section of a closed enclosure 4 having two lateral walls, an upper and a lower wall, enclosure 4 including means 5 connected by a pipe 6 to its upper part to subject the free surface 7 of the suspension to a predetermined absolute pressure value which may either be a positive pressure or a negative pressure.

The free surface 7 of the suspension in enclosure 4 is maintained at a predetermined level by a regulator 8 having two sensors 9 associated with a valve 10 which controls the flow of the suspension in conduit 1 in such a way as to maintain this level at a desired height.

The suspension in enclosure 4 then passes into a conduit 11 whose lower horizontal wall 12 is formed by an endless screen 12' forming a filter wall which moves at a constant speed in the direction of the arrow.

A regulated lip 14 at a lower extremity of conduit 11 forms the discharge opening of the machine.

Below the filter wall 12 is a tank 15 receiving the filtrate which is extracted through filter 12'. Tank 15 has a discharge opening 13. An absolute pressure of given value is maintained in tank 15 by pressure control apparatus 17 connected thereto by conduit 16.

Apparatus 17 for control of the absolute pressure in tank 15 is controlled by a differential regulator 18 connected to two pressure detectors 19 and 20 respectively located in tank 15 and in enclosure 4.

The film which forms on the filter wall 12 is removed, covered with a thin layer of suspension, through the opening defined by the lip 14 at the side of the machine. The amount of suspension so removed is controlled by regulating the value of the pressure which acts on the free surface 7, this free surface being maintained at a constant level by regulator 8 which controls valve 10 in feed conduit 1.

Differential regulator 18 by means of the pressure detectors 19 and 20 and the controls which are imposed on it, controls the absolute pressure in the tank 15 below the filter wall 12 in conjunction with the absolute value of the pressure above level 7 in such a way that the differential filtrate extraction pressure on one or the other side of the filter wall 12 remains constant.

It is therefore possible, without modifying the filtrate extraction characteristics of the machine, to regulate the amount of loss of the suspension at lip 14 by control of the pressure above the suspension.

Figure 2:
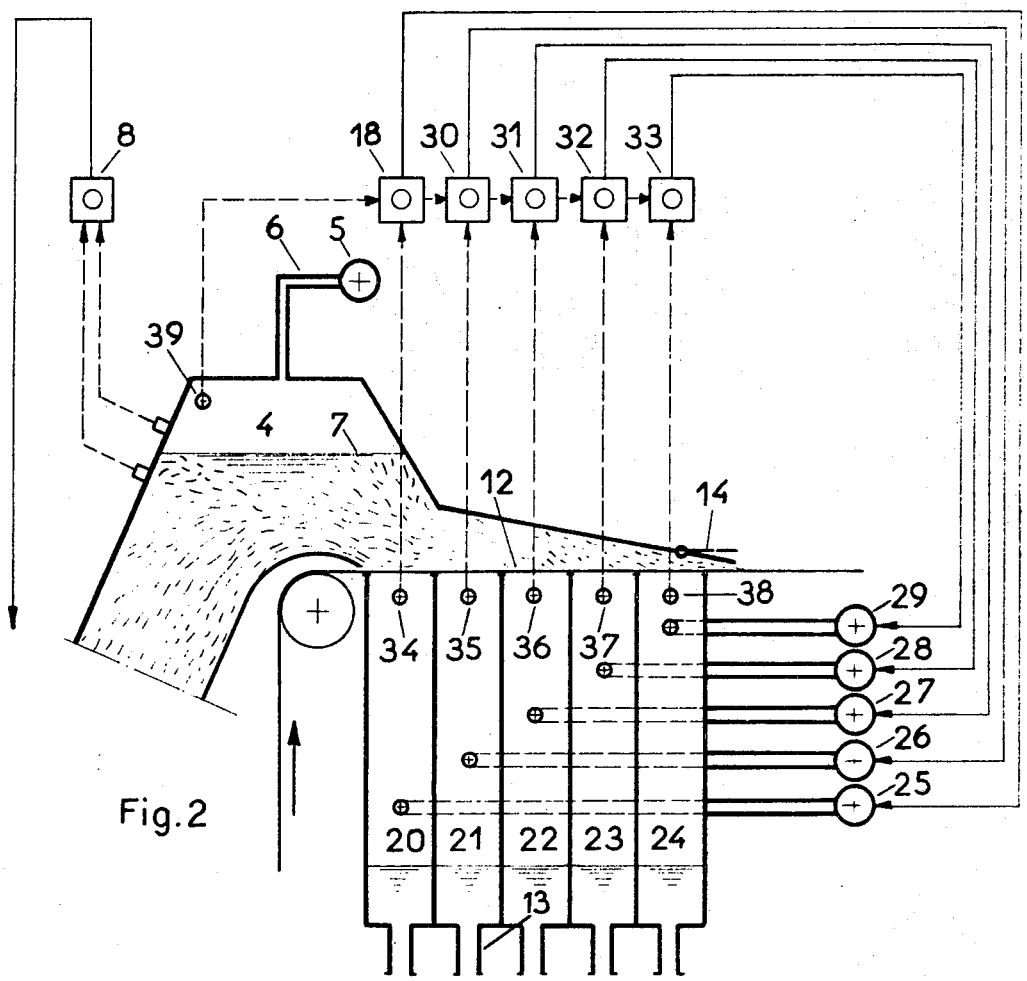
FIG. 2 is a modification of the embodiment of FIG. 1.

FIG. 2 illustrates another embodiment of the present concept in which the absolute pressure on the filter wall is controlled at varying values along the wall thus providing a varying differential pressure along the filter wall which is coordinated with the value of the absolute pressure acting on the free surface of the suspension to maintain constant the variation of the differential pressure along the filter wall.

In FIG. 2 the enclosure 4 has regulator 8 controlling level 7 and control of the absolute pressure as desired above level 7 is provided by apparatus 5 and conduit 6.

The tank beneath the filter wall 12 is divided into five chambers 20, 21, 22, 23 and 24 having, respectively, means 25, 26, 27, 28 and 29 to produce in each an absolute pressure of desired value. Discharge pipes 13 are provided for removal of the filtrate.

The absolute value of the pressure within each chamber is controlled by means of regulators 18, 30, 31, 32 and 33 and their pressure detectors, respectively, 34, 35, 36, 37 and 38 in such a way as to obtain a variable differential pressure along the length of filter wall 12.

Regulator 18, considered as pilot apparatus, is controlled by the pressure sensor 39 in such a way that an absolute value of pressure is obtained in chamber 20 in conjunction with the absolute value in tank 4 such that the pressure differential along the filter extending to the right from chamber 20 remains constant.

Regulators 30, 31, 32 and 33 are controlled by pilot regulator 18 in such a way that the absolute pressures in chambers 21, 22, 23 and 24 are maintained at values with respect to the absolute pressure in chamber 20 such that the varying differential pressure established along filter wall 12 cannot be changed.

Under these circumstances, for any given value of the absolute pressure in enclosure 4 above level 7 to control the amount of the suspension lost at lip 14, there will be a same variable differential pressure along the filter wall and consequently the same amount of extracted filtrate.

I claim:

1. Process for the control of pressures in the formation of a sheet by continuous filtration of a suspension of particles in an enclosure on a moving filter, the sheet formed on the filter leaving the enclosure through a nozzle with a loss of suspension, the steps of controlling the amount of loss of suspension by controlling the value of the absolute pressure above the level of the suspension in the enclosure and controlling the amount of filtrate extracted through the filter by control of the absolute pressure under the filter, the pressure values being coordinated and providing a predetermined pressure differential on the filter for filtrate extraction.

2. Process as described in claim 1 including the step of controlling the absolute pressure under the filter to a varying value along the length of the filter.

3. Apparatus for the continuous filtration on a moving filter of a suspension of particles comprising a feed conduit for the suspension, a chamber connected to the feed conduit, a distributor connected to said chamber, an enclosure, said distributor discharging the suspension into said enclosure with a free surface in said enclosure, lateral walls for said enclosure, an upper wall for said enclosure, a lower wall for said enclosure, an endless moving screen forming a part of said lower wall, means for moving said screen toward a lower part of the enclosure, means for regulating the absolute pressure in said enclosure above the free surface of the suspension therein, a tank receiving the filtrate extracted through the filter wall, mean opening into said tank for controlling the absolute pressure therein, a controlled opening for removal of the sheet formed on said screen at the lower part of said enclosure and means for automatically coordinating said means for regulating the absolute pressures whereby a predetermined differential pressure is maintained on said filter.

4. Apparatus as described in claim 3, said tank being divided into successive chambers along the length of the lower portion of said filter wall, and individual means for regulating the absolute pressure in each of said chambers.

5. Apparatus as defined in claim 4, said means for individual regulation of absolute pressure in each of means chambers being automatically controlled whereby a predetermined variation of the differential pressure is maintained along the length of said filter wall.

* * * * *